US012429034B2

(12) United States Patent
Cordero Placer et al.

(10) Patent No.: US 12,429,034 B2
(45) Date of Patent: Sep. 30, 2025

(54) MODULAR ROBOT FOR REMOTE REPAIR OF WIND TURBINE BLADES

(71) Applicants: IMFUTURE—INTEGRAL MANAGEMENT FUTURE RENEWABLES, S.L., Ortoño-Ames (ES); ANALISIS Y SOLUCIONES DE INGENIERIA S.L., PONTEVEDRA (ES)

(72) Inventors: Jesús Cordero Placer, Ortoño-Ames (ES); Javier Canosa Louzán, Ortoño-Ames (ES)

(73) Assignees: IMFUTURE—INTEGRAL MANAGEMENT FUTURE RENEWABLES, S.L., Ortoño-Ames (ES); ANALISIS Y SOLUCIONES DE INGENIERIA S.L., Pontevedra (ES)

( * ) Notice: Subject to any disclaimer, the term of this patent is extended or adjusted under 35 U.S.C. 154(b) by 0 days.

(21) Appl. No.: 18/858,400

(22) PCT Filed: Mar. 31, 2023

(86) PCT No.: PCT/ES2023/070212
§ 371 (c)(1),
(2) Date: Oct. 21, 2024

(87) PCT Pub. No.: WO2023/203267
PCT Pub. Date: Oct. 26, 2023

(65) Prior Publication Data
US 2025/0109736 A1    Apr. 3, 2025

(30) Foreign Application Priority Data
Apr. 19, 2022  (ES) ................ ES202230351

(51) Int. Cl.
*F03D 80/50* (2016.01)
*B23Q 9/00* (2006.01)
(Continued)

(52) U.S. Cl.
CPC .......... *F03D 80/50* (2016.05); *B23Q 9/0007* (2013.01); *B25J 5/005* (2013.01); *B25J 19/023* (2013.01);
(Continued)

(58) Field of Classification Search
CPC ............... F03D 17/001; F03D 17/004; F03D 17/028–0285; F03D 80/50; F03D 80/502;
(Continued)

(56) References Cited

U.S. PATENT DOCUMENTS 6,671,582 B1 * 12/2003 Hanley ................. A01B 51/02
47/1.01 R
12,296,901 B2 * 5/2025 Bressler ................ B25J 11/005
(Continued)

FOREIGN PATENT DOCUMENTS

CN    103963043 A  *  8/2014  ............. B25J 5/005
CN    109883680 A     6/2019
(Continued)

OTHER PUBLICATIONS

International Search Report for related patent application PCT/ES2023/070212 prepared by the Spanish Patent Office and dated May 17, 2023, English version provided.
(Continued)

*Primary Examiner* — Matthew P Travers
(74) *Attorney, Agent, or Firm* — Hassan Abbas Shakir; Shakir Law PLLC

(57) ABSTRACT

A robot includes front and rear traction modules to circulate throughout the inside of a wind turbine blade; two intermediate modules able to be inserted between the front module
(Continued)

and the rear module, which include an intermediate machining module to machine fissures and cracks from within the blade; and an intermediate patching module to apply, compact and cure repair patches on the fissures and cracks; and a remote control system to monitor parameters and control the repair actions.

15 Claims, 19 Drawing Sheets

(51) Int. Cl.
*B25J 5/00* (2006.01)
*B25J 19/02* (2006.01)
*F03D 17/00* (2016.01)

(52) U.S. Cl.
CPC ......... *F03D 17/004* (2023.08); *F03D 17/028* (2023.08); *F03D 80/502* (2023.08); *F05B 2230/80* (2013.01)

(58) Field of Classification Search
CPC ...... F05B 2230/80; B25J 5/005; B25J 19/023; B23Q 9/0007; Y10T 29/53983
See application file for complete search history.

(56) References Cited

U.S. PATENT DOCUMENTS

| | | | |
|---|---|---|---|
| 2015/0135459 A1* | 5/2015 | Lee | B08B 5/02 |
| | | | 901/44 |
| 2015/0204193 A1 | 7/2015 | Anasis et al. | |
| 2019/0283821 A1* | 9/2019 | Georgeson | F03D 17/00 |
| 2020/0325878 A1* | 10/2020 | Danko | B08B 1/30 |
| 2021/0017963 A1 | 1/2021 | Hoare et al. | |

FOREIGN PATENT DOCUMENTS

| | | | |
|---|---|---|---|
| CN | 111230898 A | * | 6/2020 |
| CN | 118288255 A | * | 7/2024 |
| EP | 2733350 A2 | | 5/2014 |
| ES | 2554705 A1 | | 12/2015 |
| GB | 2548801 A | | 10/2017 |
| KR | 2013-0025526 A | | 3/2013 |
| WO | 2015081013 A1 | | 6/2015 |
| WO | 2016101953 A1 | | 6/2016 |
| WO | 2018010749 A1 | | 1/2018 |
| WO | 2019155234 A1 | | 8/2019 |
| WO | WO-2021121522 A1 | * | 6/2021 |

OTHER PUBLICATIONS

Written Opinion by the International Searching Authority for related patent application PCT/ES2023/070212 prepared by the European Patent Office and dated May 17, 2023, English version provided.

* cited by examiner

MODULAR ROBOT FOR REMOTE REPAIR OF WIND TURBINE BLADES

CROSS-REFERENCE TO RELATED APPLICATIONS

This application is a national stage application under 35 U.S.C. § 371 of PCT patent application PCT/ES2023/070212 filed on 31 Mar. 2023, which is pending and which is hereby incorporated by reference in its entirety for all purposes. PCT patent application PCT/ES2023/070212 claims priority to Spanish patent application ES P202230351 filed 19 Apr. 2022, which is hereby incorporated by reference in its entirety for all purposes.

Technical Field of the Invention

The present invention belongs to the field of remote controlled robots and relates to a robot to repair damaged or defective areas of a wind turbine blade, capable of carrying out repairs on internal structural cracks in said blade, accessing areas of the blade that an operator is unable to reach, avoiding catastrophic failures, thus prolonging the useful life of the blade.

Background of the Invention

A wind turbine, also called a "wind generator" or "air turbine", is a device that produces electricity by converting wind energy into mechanical energy. A conventional wind turbine consists of a tower, a nacelle mounted on the top portion of the tower, and a rotor with several blades mounted on a shaft in the nacelle. Wind turbine blades are the largest single-piece composite material structures built in the world, even larger than the wings of any aircraft. In addition, the trend in the sector is to put into operation wind turbines of increasingly greater power, with blades more than 100 metres long. Blades undergo more than one billion load cycles during their useful life, making regular inspection and maintenance critical to keeping wind turbines in service. Current inspection methods have a limited ability to detect structural damage early, which is crucial to avoid extremely costly repairs, prevent catastrophic failures and enable repairs to be carried out in order to extend the life of a blade.

With current repair technologies, it is possible to remedy and repair cracks up to one third of the total length of a blade by means of operator access. Cracks in the other two-thirds of the blade's total length cannot be repaired, so they can spread further and potentially lead to catastrophic failure. If they are detected before a structural failure, the blade would be discarded and replaced. Furthermore, the currently available methods and technologies for internal inspection and repair of blades require long downtimes for the wind turbine, with the resulting economic burden on the operating company. These are expensive jobs and involve exposing operators to working at heights, in confined spaces and harmful environments.

In the state of the art there is a plurality of disclosures directed to unmanned, remotely controlled devices related to the inspection and maintenance of wind turbine blades. KR10-2013-0025526 is known to define a concept for a robot that can move around the outside of a wind turbine blade on wheels to perform inspection and maintenance tasks. WO2015081013 defines a concept of a general-purpose maintenance and repair robot, which can move around on tracks and is equipped with sensors and/or cameras and an arm with "a structural maintenance tool", for maintenance applications in infrastructures, buildings and bridges. WO2018010749 defines a concept of a "climbing" robot with guide cables that can perform repair operations on the outer surface of the blade. WO2019155234 defines a concept of a spider-type robot, which can move around the outside of the wind turbine with suction cups to perform inspection and maintenance tasks. Finally, there is ES2554705, which describes a maintenance robot for outer vertical surfaces of the wind turbine, equipped with a high-pressure water cannon.

In summary, it can be seen that existing devices are focused on carrying out maintenance and/or repair tasks on the outside of the wind turbine, both on the tower and on the blades.

According to the information provided above, it can be highlighted that in the state of the art there is a need to design and implement a robot or a remotely controlled device, which can perform repairs on cracks inside the blade, reaching areas of the blade that an operator is unable to reach, avoiding catastrophic failures, thus prolonging the useful life of the blade.

Description of the Invention

The present invention relates to a modular robot to remotely repair weakened areas of a wind turbine blade.

In particular, the robot of the present invention makes it possible to repair fissures and cracks while keeping the blade mounted on the wind turbine, thereby avoiding having to remove the blade from its operating position and lower it to ground level in order to reinforce the area weakened by the fissures or cracks. Furthermore, the robot of the present invention allows repairs to be made on fissures and cracks in areas far from the root of the blade that an operator is unable to reach, with the robot being of very small dimensions.

To achieve this goal, the robot of the present innovation comprises three modules. A front module and a rear module each include front and rear traction systems, such as, for example, front and rear tracks. Additionally, inserted between the front and rear modules, there is an interchangeable intermediate module intended to carry out repair operations. In this sense, the intermediate module can be: an intermediate machining module, intended to perform machining functions, especially milling; or an intermediate patching module, intended to carry out the application, compaction and curing of pre-impregnated repair patches made of composite materials. Depending on whether the operation to repair the crack consists of machining or placing a repair patch, the intermediate module placed between the front and rear modules is the intermediate machining module, or the intermediate patching module, respectively.

The three modules are small in size, that is, they are large enough to reach areas of the shovel that are impossible for an operator to reach. The intermediate patching module integrates an expansion bladder that conforms to and exerts uniform pressure on the area to be repaired, and also integrates a thermal blanket in the expansion bladder to cure at a controlled temperature. The robot has electronics to control operations and transform electric current in the front module.

The modular robot of the present invention also comprises a remote control system, preferably connected to the rear module, although it can also be connected to the front module, by means of an umbilical cable, for electrical and communications connections, data transmission, for remote management and monitoring of machining operations and application of repair patches.

In a preferred embodiment, the control system has pre-configured machining patterns, such as milling, and previously tested and validated patches made of pre-cut, pre-impregnated composite material.

The control system can monitor critical process parameters such as machining dimensions, curing pressure and temperature, generating a report certifying the repair.

In one embodiment, the intermediate machining module has contact probing means communicated with the control system to determine the exact shape of the surface to be machined.

In one embodiment, the control system may have pre-defined machining routes configured according to the repair to be performed.

In one embodiment, the traction systems of the front and rear modules may be equipped with tracks, and encoders to determine the displacement made and its exact position.

In one embodiment, the robot may integrate high-resolution cameras, such as: a front camera; a rear camera; a lower machining camera; and an upper patching camera for placing the patch.

In one embodiment, the robot integrates its own compressor and a vacuum generator.

In one embodiment, the intermediate machining module integrates suction cups to immobilise it and prevent movement or vibration during machining.

In one embodiment, the intermediate machining module integrates a suction system for sucking up machining waste and stores waste in a tank of the rear functional module.

In one embodiment, the intermediate patching module has a scissor-type lifting system to apply the patch and withstand the stress of the expansion bladder.

In one embodiment, the intermediate machining module makes reference marks to allow optimal positioning in the subsequent operation to apply a repair patch.

In one embodiment, the intermediate patching module integrates temperature sensors in the thermal blanket and a pressure sensor in the pneumatic air circuit of the bladder.

In one embodiment, the umbilical cable between the robot and the control system is integrated in a resistant cover, allowing recovery of the device in the event of a malfunction.

In one embodiment, the intermediate machining module may integrate a laser to determine the machining zone.

In one embodiment, the intermediate, machining and patching modules may have specific connections, preferably those known as "quick connect" for the electric current, communications and compressed air supply.

In one embodiment, the robot, by means of its second additional modules, has a platform that carries consumables for repair in the form of stackable layers with pre-impregnated composite material cut in a stepped manner, peelable material, perforated film and absorption blanket, integrating a clamp that holds the peelable layer (peel ply), to remove it once the curing cycle is finished.

In one embodiment, the intermediate patching module has an adjustable upper platform, which allows the precise positioning of the patch on the previously machined and repaired area.

List of References

1 Front module
2 Intermediate machining module
3 Rear module
4 LED lighting of 1
6 Upper contact wheels
6 Quick power and communications connect system
7 Quick connect tube
8 Machining Camera
9 Milling head
10 Quick connect system
11 Encoder of 1
12 Front tracks
13 Front electric motor
14 Machining displacement wheels
15 Rear electric motor
16 Rear tracks
17 Side contact wheels
18 Suction cups
19 Compressor
20 Front camera
21 Intermediate patch module
22 Repair Patch
23 Patching Camera
24 Expansion bladder of 21
25 Lifting platform scissors of 21
26 Pressure sensors of 21
27 Temperature sensors of 21
28 Blade
29 Patching displacement wheels
30 LED lighting of 3
31 Rear camera
32 Control system
33 Robot
34 Crack in the blade
35 Reel of 36
36 Umbilical cable
37 Operator

BRIEF DESCRIPTION OF THE FIGURES

The present invention is more clearly understood from the following figures where the components associated with the robot of the present invention as well as the novel elements with respect to the state of the art are shown, where the figures are of an informative nature and are not intended to limit the scope of the invention, where.

DETAILED DESCRIPTION OF THE INVENTION

With reference to FIGS. 1 to 19, a preferred exemplary embodiment or modality of the present invention is illustrated.

As can be seen from the different views depicted in FIGS. 1 to 19, the present invention relates to a robot 33 to repair weakened areas of a wind turbine blade 28, with the ability to perform repairs on fissure 34 in the internal structures of the blade 28.

Figure 1:
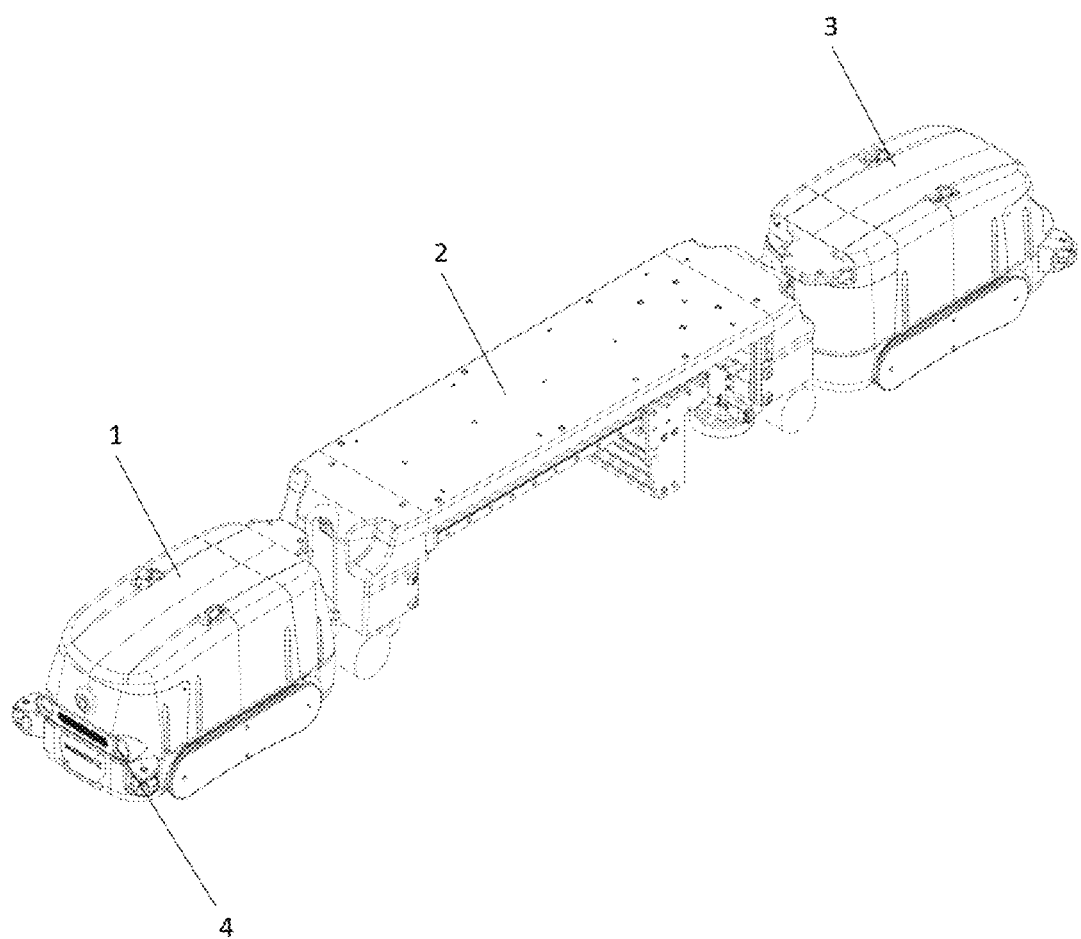
FIG. 1 illustrates a perspective view according to a first embodiment of the robot of the present invention, with an intermediate milling-type machining module.
Figure 2:
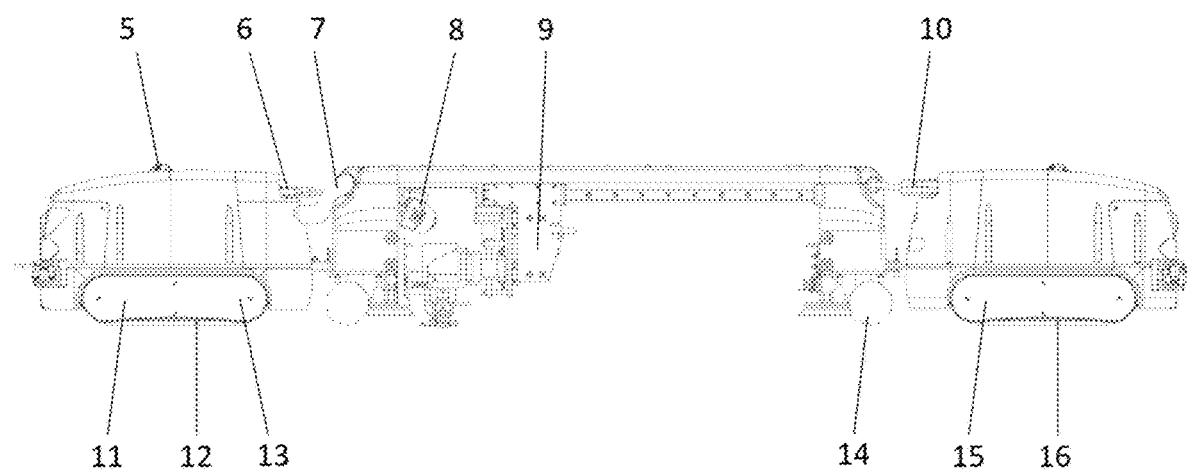
FIG. 2 shows a schematic side view of the robot in FIG. 1.

According to FIG. 1, the robot 33 (see FIG. 12) has a front traction module 1 with front LED lighting 4, as well as a rear traction module 3. It also has an interchangeable intermediate machining module 2 to machine, in general, mill, predefined shapes in the area where a fissure 34 has been detected (see FIG. 12). FIG. 2 shows that the front 1 and rear 3 modules incorporate upper contact wheels 5 of the omni-directional type, also called "omniwheel". The front module 1 incorporates a suction system with a connection tube 7, preferably a quick connect tube, in addition to a communications and power connection system 6, preferably of the "quick connect" type. The intermediate machining module 2 incorporates a high-resolution machining camera 8 to monitor the machining/milling operation. It incorporates a three-axis milling head 9 mounted on linear guides. The intermediate machining module 2 also incorporates a connection system 10, such as a quick connect type, with the rear module 3. The rear module 3 incorporates a rear drive system with rear tracks 16, driven by a rear electric motor 15. The intermediate machining module 2 incorporates four machining displacement wheels 14. The front module 1 incorporates a rear traction system with front tracks 12, driven by a front electric motor 13, and incorporates an encoder 11 to accurately determine the displacement performed.

Figure 3:
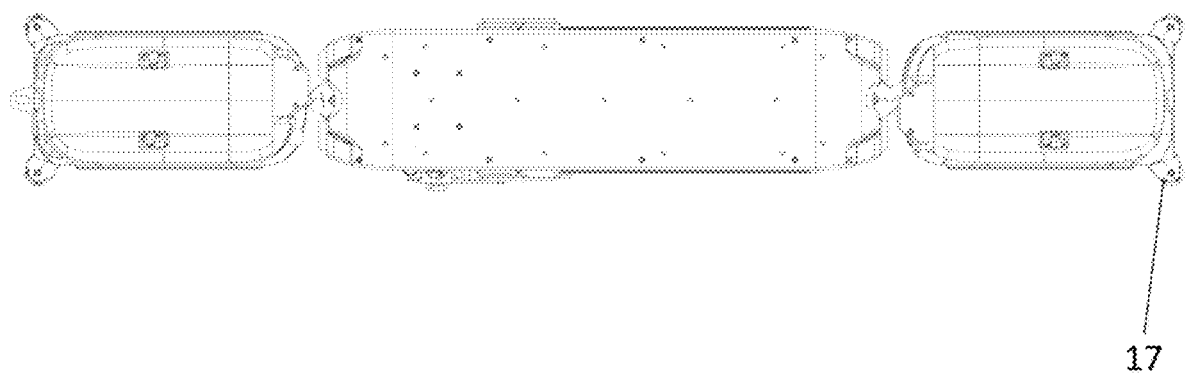
FIG. 3 shows a schematic top view of the robot in FIGS. 1-2.

As can be seen in FIG. 3, the front 1 and rear 3 modules incorporate side contact wheels 17 in order to protect the robot 33 from rubbing against the inner faces of the work space.

Figure 4:
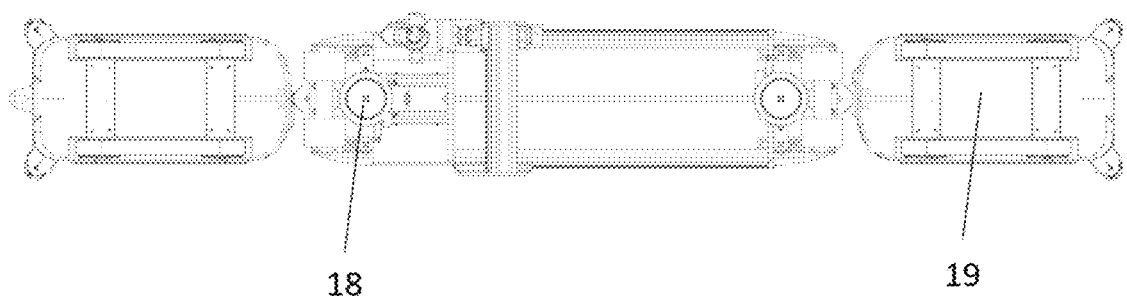
FIG. 4 shows a schematic bottom view of the robot in FIGS. 1-3.

In FIG. 4 it can be seen that the intermediate machining module 2 integrates two suction cups 18 to immobilise it and avoid movements or vibrations during the milling operation. It also incorporates a compressor 19 and a vacuum generator to generate a vacuum.

Figure 5:
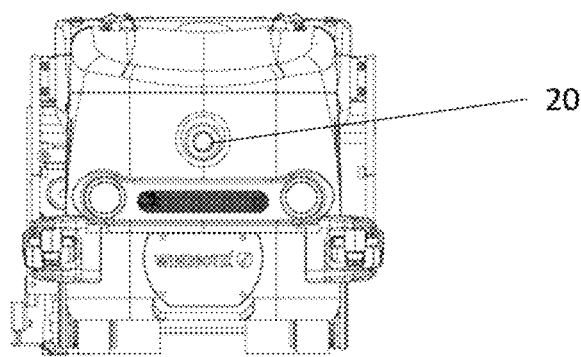
FIG. 5 shows a schematic front view of the robot in FIGS. 1-4.

The front module 1 incorporates a high-resolution front camera 20, see FIG. 5.

Figure 6:
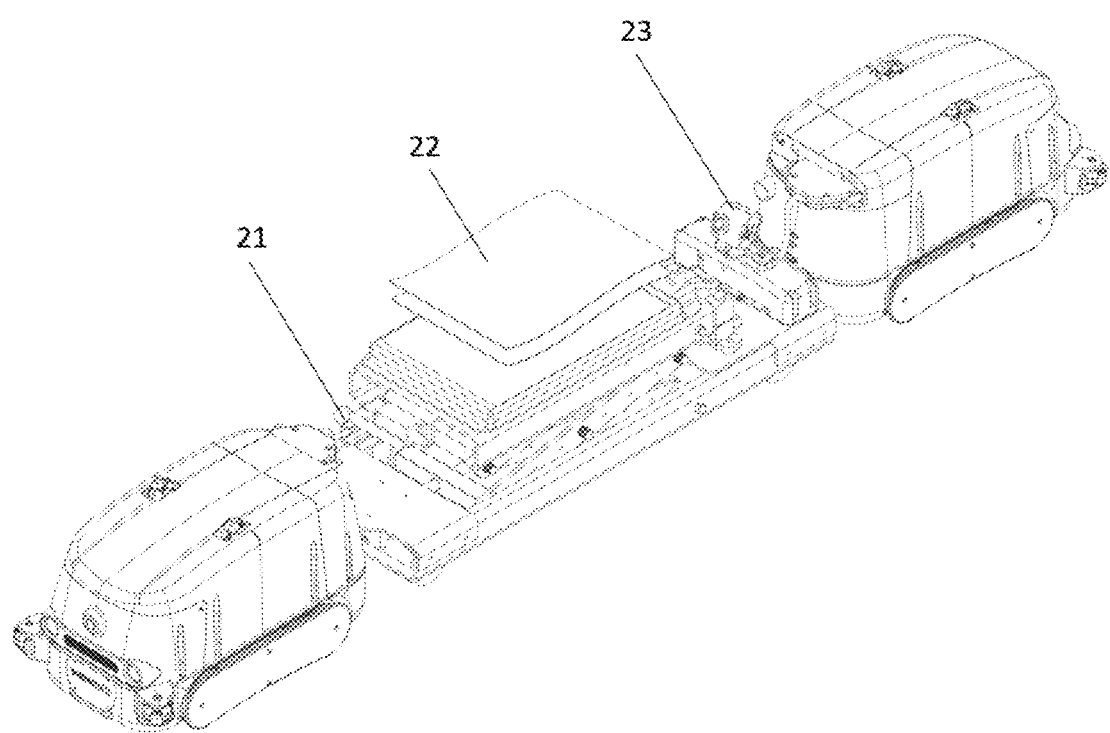
FIG. 6 illustrates a perspective view according to a second embodiment of the robot of the present invention, with an intermediate patching module.

FIG. 6 shows an intermediate patching module 21 which carries repair patches 22, and a high-resolution patching camera 23.

Figure 7:
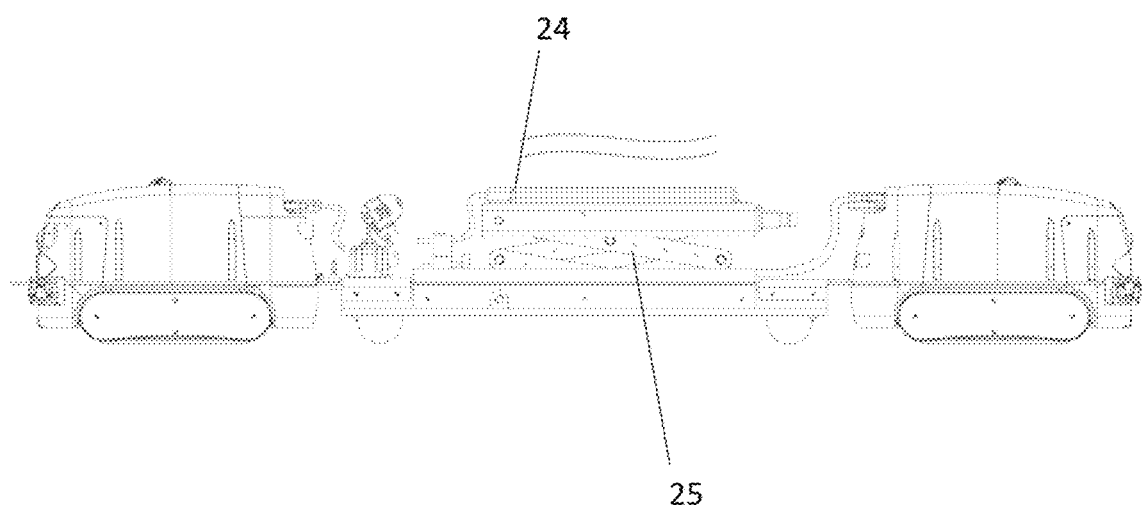
FIG. 7 shows a schematic side view of the robot in FIG. 6.
Figure 8:
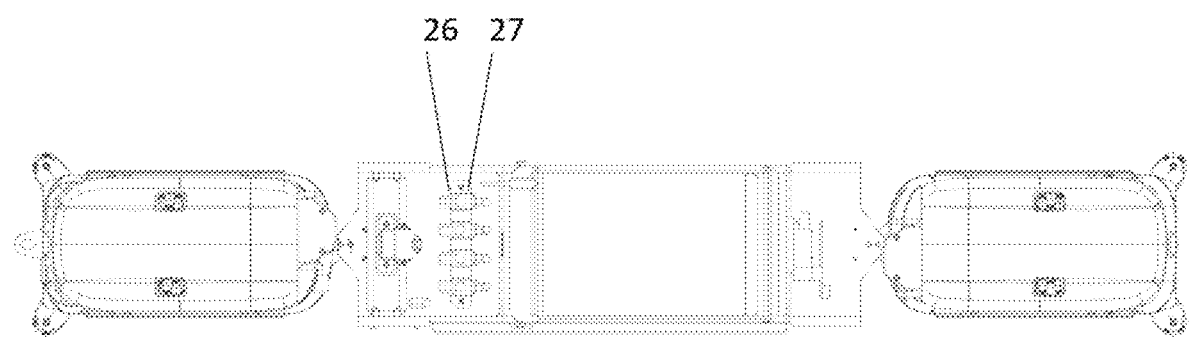
FIG. 8 shows a schematic top view of the robot in FIGS. 6-7.
Figure 9:
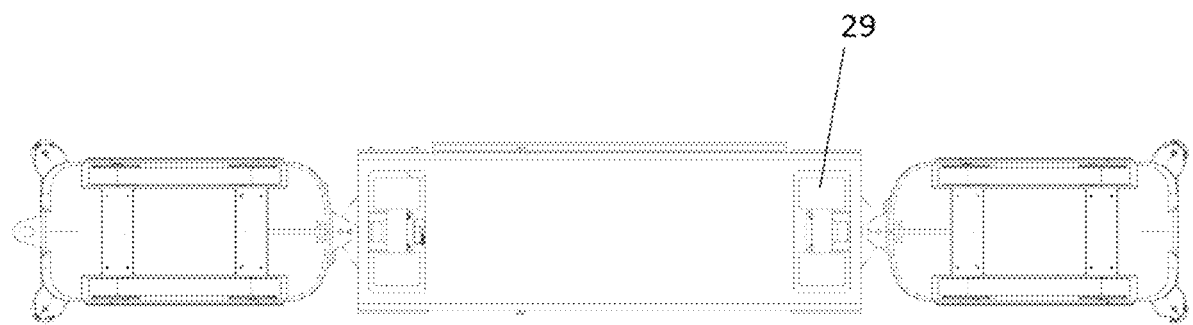
FIG. 9 shows a schematic bottom view of the robot in FIGS. 6-8.

According to FIG. 7, the second intermediate patching module 21 to apply patches 22 has a scissor lifting platform 25 and incorporates an expansion bladder 24. It also incorporates, see FIG. 8, pressure sensors 26 and temperature sensors 27 to be able to monitor the operation of gluing the patch 22. It incorporates four patching displacement wheels 29, see FIG. 9.

Figure 10:
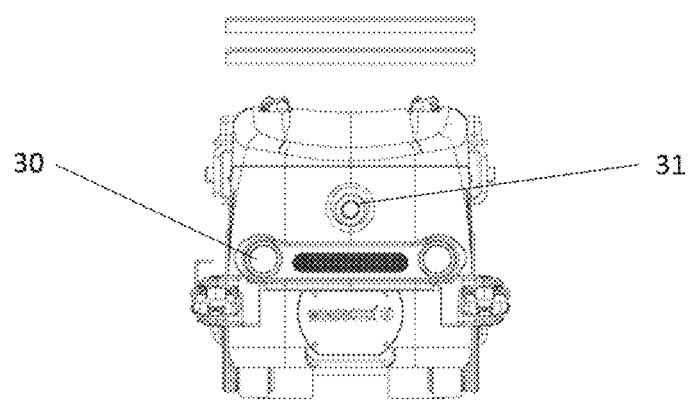
FIG. 10 shows a schematic front view of the robot in FIGS. 6-9.

It can be seen in FIG. 10 that the rear module 3 incorporates rear LED lighting 30 and a high-resolution rear camera 31.

Figure 11:
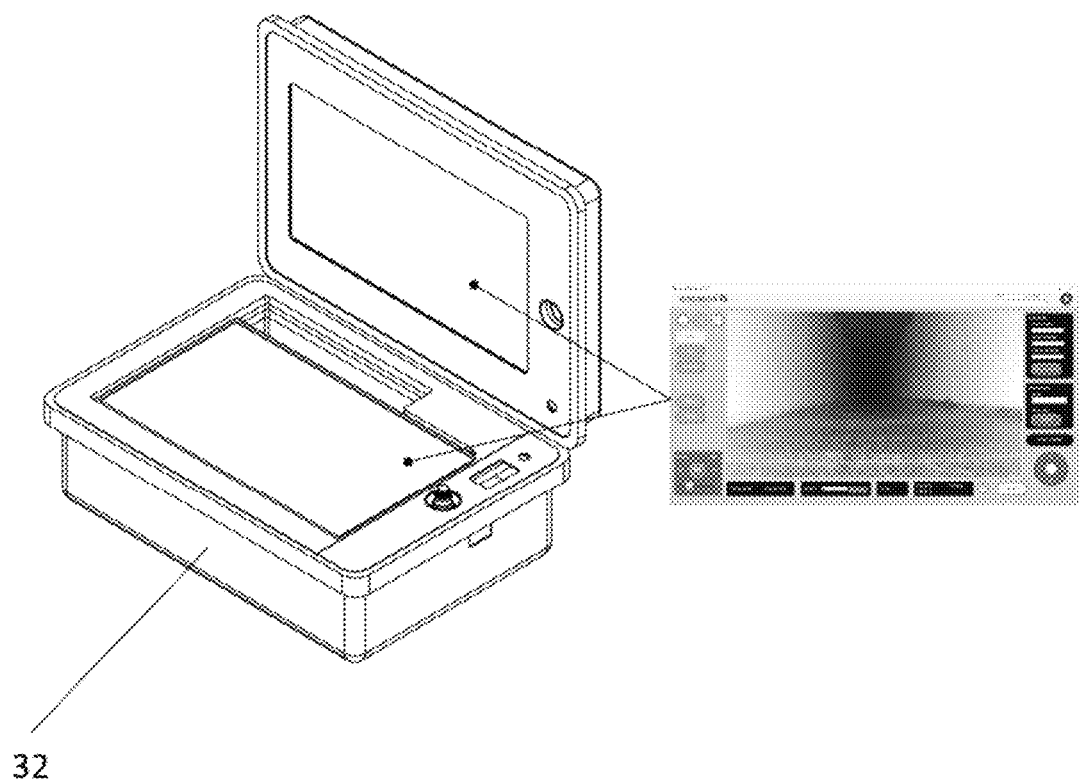
FIG. 11 shows a schematic front view of the control system of the robot of the present invention.

FIG. 11 shows a remote control system 32 which displays the captured images in real time and can monitor critical process parameters such as milling dimensions, curing pressure and temperature, generating a repair certification report.

Figure 12:
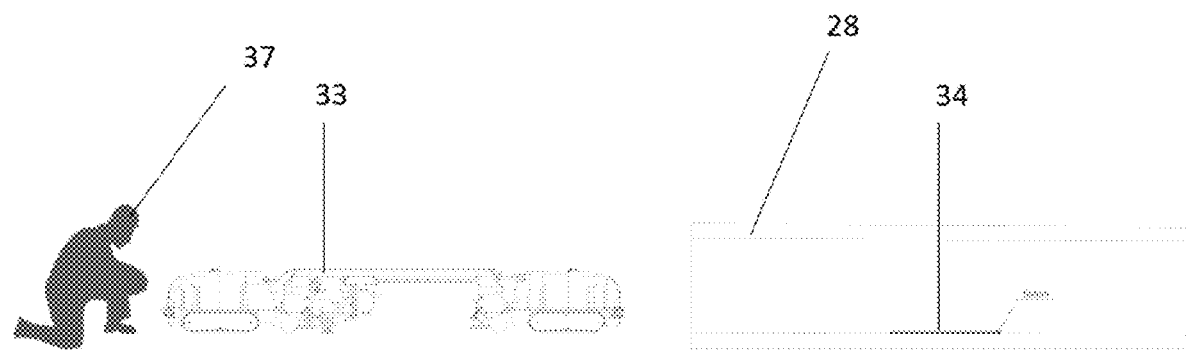
FIG. 12 shows the operation of placing the robot in FIGS. 1-5 on the blade, before its displacement to the position where the repair is to be performed by means of a milling-type machining operation.

FIG. 12 shows an example of placing the robot 33 with the intermediate machining module 2 within the blade 28 performed by an operator 37, to begin the process of repairing a fissure 34.

Figure 13:
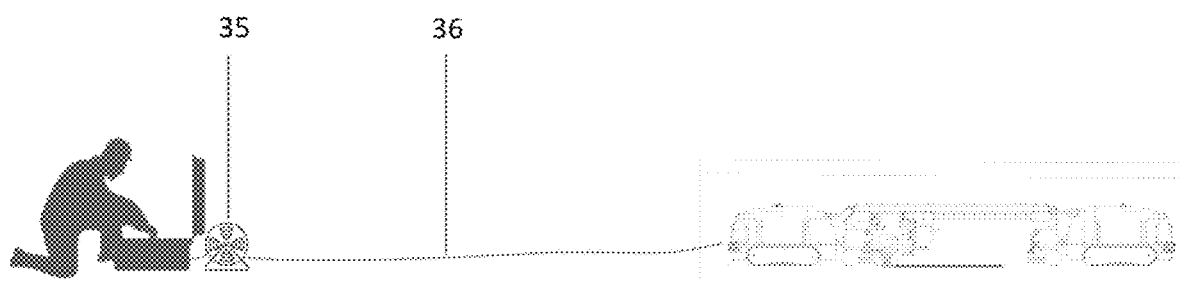
FIG. 13 shows the robot in FIGS. 1-5 and 12 on the blade, displaced to the position where the repair is to be performed.

FIG. 13 shows an example of the operation of the robot 33 of FIG. 12, controlled by the operator 37 with a control system 32, displaced to the fissure 34 to be repaired, with an umbilical cable 36 and the reel 35 to wind up the umbilical cable 36.

Figure 14:
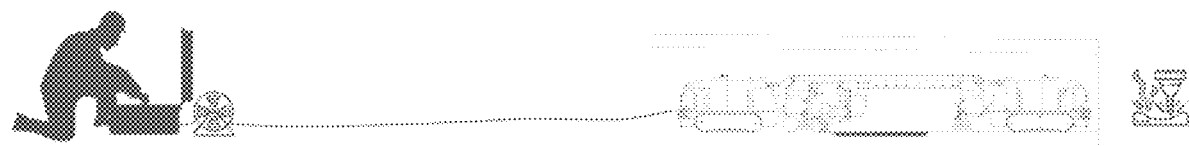
FIG. 14 shows the robot in FIGS. 1-5 and 12-13, performing the milling operation.

FIG. 14 shows an example of a milling operation with a predefined shape.

Figure 15:
FIG. 15 shows the operation of placing the robot in FIGS. 6-10 on the blade, with the blade rotated 180°, before its displacement to the position where the repair is to be carried out by means of an operation of gluing the repair patch.

FIG. 15 shows the robot 33 with the intermediate patching module 21 placed within the blade 28, which has already been rotated 180°, so that the area to be repaired, with the fissure 34, is located above the robot 33.

Figure 16:
FIG. 16 shows the robot in FIGS. 6-10 and 15 on the blade, displaced to the position where the repair is to be performed.

FIG. 16 shows the robot 33 with the intermediate patching module 21 displaced to the repair area.

Figure 17:
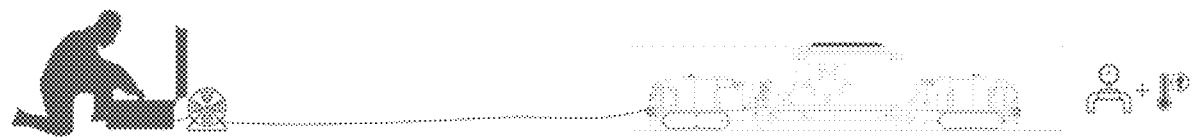
FIG. 17 shows the robot in FIGS. 6-10 and 15-16 on the blade, performing the operation of gluing the repair patch, applying pressure and temperature.

FIG. 17 shows the robot 33 with the intermediate patching module 21 positioned in the repair area, applying the patch 22 with the lifting platform in the lifted position, applying a predefined pressure and temperature.

Figure 18:
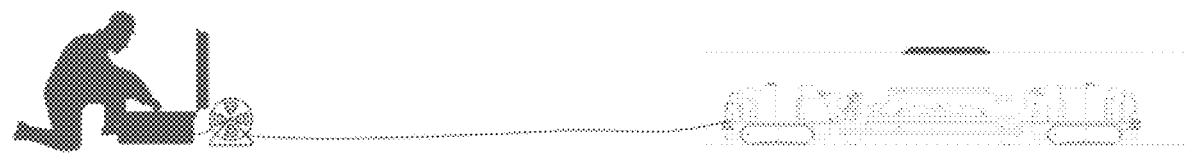
FIG. 18 shows the robot in FIGS. 6-10 and 15-17 on the blade, once the operation of gluing the repair patch has been completed.

FIG. 18 shows the robot 33 with the intermediate patching module 21 positioned in the repair area when the operation to apply a patch 22 has been completed.

Figure 19:
FIG. 19 shows the robot in FIGS. 6-10 and 15-18 on the blade, returned to the starting position.

FIG. 19 shows the robot 33 with the intermediate patching module 21 returned to the position where the operator 37 is.

The invention claimed is:

1. A modular robot for the repair of wind turbine blades, the modular robot comprising:
 a front module, with a front traction system;
 a rear module, with a rear traction system; the front and rear modules being configured to circulate throughout an inside of a wind turbine blade;
 two intermediate modules, selectively able to be inserted between the front module and the rear module, to perform repair operations on cracks and fissures in the blade, and which comprise:
 an intermediate machining module, to carry out machining on fissures and cracks from within the blade; and
 an intermediate patching module to apply, compact and cure repair patches on the fissures and cracks; and a remote control system to monitor parameters and control the repair actions.

2. The modular robot according to claim 1, wherein the intermediate patching module comprises:
   an expansion bladder configured, and communicated with the control system to conform to the cracks and fissures and exert uniform pressure; and
   a thermal blanket in the expansion bladder to cure at controlled temperature.

3. The modular robot according to claim 2, wherein the intermediate patching module comprises a scissor lifting platform to apply the patch and withstand a force of the expansion bladder.

4. The modular robot according to claim 3, wherein the intermediate patching module integrates temperature sensors in the thermal blanket and a pressure sensor in a pneumatic circuit of the expansion bladder.

5. The modular robot according to claim 1, wherein the front traction system includes front tracks and an encoder, while the rear traction system includes rear tracks.

6. The modular robot according to claim 1, further comprising at least one of the following cameras:
   a front camera mounted on the front module;
   a rear camera mounted on the rear module;
   a machining camera at a bottom of the intermediate machining module to monitor the machining operation; and
   a patching camera at a top portion of the intermediate patching module to monitor the patching operation.

7. The modular robot according to claim 6, wherein the intermediate machining module comprises a compressor and a vacuum generator.

8. The modular robot according to claim 7, wherein the intermediate machining module comprises suction cups for immobilization.

9. The modular robot according to claim 8, wherein the intermediate machining module comprises a suction system for sucking up machining waste and a tank for storing the sucked up machining waste.

10. The modular robot according to claim 1, wherein the intermediate machining module has contact probe communicated with the control system to determine the exact shape of the surface to be machined.

11. The modular robot according to claim 1, wherein the control system is configured to monitor machining parameters.

12. The modular robot according to claim 1, wherein the intermediate machining module is configured to make reference marks on the blade to allow positioning in a subsequent operation to apply a patch.

13. The modular robot according to claim 1, wherein the intermediate machining module comprises a laser to determine the machining area.

14. The modular robot according to claim 1, further comprising an umbilical cable that connects the control system with the front module or the rear module.

15. The modular robot according to claim 14, wherein the umbilical cable also comprises a protective cover to allow recovery of the robot in the event of a malfunction.

* * * * *